(No Model.)
F. A. MAYS.
ANT TRAP.
No. 356,256. Patented Jan. 18, 1887.
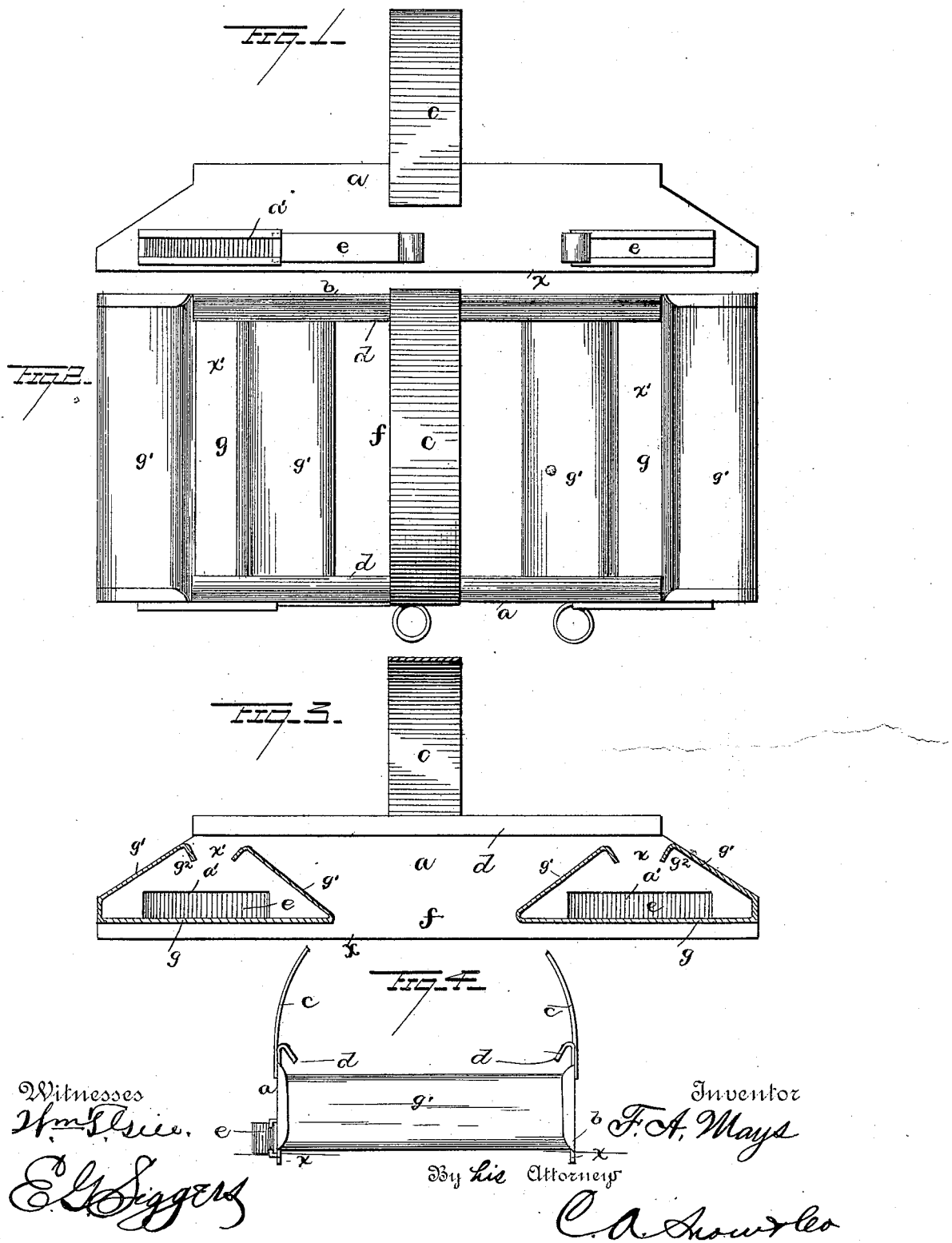

UNITED STATES PATENT OFFICE.

FRANCIS A. MAYS, OF ANTHON, TEXAS.

ANT-TRAP.

SPECIFICATION forming part of Letters Patent No. 356,256, dated January 18, 1887.

Application filed June 26, 1886. Serial No. 206,350. (No model.)

*To all whom it may concern:*

Be it known that I, FRANCIS A. MAYS, a citizen of the United States, residing at Anthon, in the county of Parker and State of Texas, have invented a new and useful Improvement in Ant-Traps, of which the following is a specification.

My invention relates to traps for catching ants and other similar insects; and the object of my invention is to provide a trap which shall be portable, simple in construction, and thoroughly efficient in operation.

To the above purposes my invention consists in certain peculiar and novel features of construction and arrangement, as hereinafter described and claimed.

In order that my invention may be fully understood I will proceed to describe it with reference to the accompanying drawings, in which—

Figure 1 is a side elevation of my improved ant-trap. Fig. 2 is a plan view of the same. Fig. 3 is an end elevation of the same. Fig. 4 is a vertical longitudinal section of the same.

In the said drawings, $a\,b$ designate two parallel pieces forming the sides of the device and extending throughout the length thereof. Said side pieces are connected midway of their length by a bail or handle, $c$, and have their upper edges, $d$, bent inward and downward, as shown. The side piece $a$ is formed at each end with a slot, $a'$, and said slots are closed by slides $e$ working upon the outer side of said piece $a$. At each end of the frame is located the trap proper, the two traps being alike, and the space $f$ between said traps serving to receive the ant-hill. The lower edges, $x$, of the side pieces, $a\,b$, extend below the bottoms $g$ of the traps proper, so that said edges $x$ may be forced into the ground and prevent the insects from escaping under the sides of the device.

Each trap consists of a bottom, $g$, and oblique convergent sides $g'$, the upper edges of which are separated to leave an opening, $x'$, in the top of the trap, the said upper edges of the sides $g'$ being bent downward, as shown at $g^2$. The openings or slots $a'$ each communicate with the interior of one of the traps and serve to permit the removal of the insects from the trap when desired. The bent edges $d\,g^2$, above described, prevent the insects from escaping over the sides of the frame or traps.

It will thus be seen that the device will capture insects either traveling to or from their burrows, and that it is simple, durable, and efficient in action.

Having thus described my invention, what I claim as new, and desire to secure by Letters Patent, is—

1. The combination, with the side pieces, $a\,b$, of the traps $g$, located between opposite ends of said side pieces and separated by an inclosed space, the openings $a'$ communicating with said traps and the slides for closing said openings, as set forth.

2. The combination, with the side piece $a$, having slots $a'$ and bent edge $d$, and carrying slides $e$, and the side $b$, having also bent edge $d$, of the traps $g\,g'$ and bail $c$, as described.

3. The traps having the horizontal bottoms and the upwardly-converging inclined sides $g'$, having their upper edges downturned at $g^2$ to form openings $x'$, in combination with the vertical side pieces, $a\,b$, forming the ends of the traps and connecting the same together, the said side pieces having the downturned upper edges, $d$, and the depending lower edges, $x$, for the purpose set forth, substantially as described.

In testimony that I claim the foregoing as my own I have hereto affixed my signature in presence of two witnesses.

FRANCIS A. MAYS.

Witnesses:
W. R. CALVERT,
J. B. PRICE.